United States Patent [19]

Smith

[11] 4,229,739

[45] Oct. 21, 1980

[54] SPREAD BEAM COMPUTATIONAL HARDWARE FOR DIGITAL BEAM CONTROLLERS

[75] Inventor: Winthrop W. Smith, Maitland, Fla.

[73] Assignee: Westinghouse Electric Corp., Pittsburgh, Pa.

[21] Appl. No.: 964,565

[22] Filed: Nov. 29, 1978

[51] Int. Cl.[2] .......... H04B 7/00

[52] U.S. Cl. .......... 343/100 SA

[58] Field of Search .......... 343/100 SA; 364/480

[56] References Cited

U.S. PATENT DOCUMENTS

| | | | |
|---|---|---|---|
| 3,500,412 | 3/1970 | Trigon | 343/100 SA |
| 3,643,075 | 2/1972 | Hayes | 343/100 SA X |
| 3,877,012 | 4/1975 | Nelson | 343/100 SA |
| 3,999,182 | 12/1976 | Moeller et al. | 343/100 SA |

*Primary Examiner*—Theodore M. Blum
*Attorney, Agent, or Firm*—W. E. Zitelli

[57] ABSTRACT

A spread beam computational section of a digital beam controller for an electronically controlled phased array radar includes a linear computational portion for computing a plurality of pairs of intermediate digital words corresponding to a desired spread beam radar pattern; and a non-linear computational portion for computing a spread beam phase command word from each computed pair of intermediate digital words which have been digitally rounded off. The instant disclosure is directed to apparatus which is disposed in the spread beam computational section for digitally rounding off each computed pair of intermediate digital words by adding randomly generated digital words to a residue bit portion thereof, preferably to the most significant bits of the residue bit portion. The corresponding pairs of resultant words from the additions are truncated to a primary number of bits, more significant than the residue bits, prior to being provided to the non-linear computational portion of the spread beam computational section. The randomization process embodied by the digital round off apparatus permits the computed intermediate digital words to be rounded off to fewer significant bits than that offered by other known systems while preserving the error contribution due to the round off operation within desirable limits. As a result, the non-linear computational hardware of the beam spreading computational section may be substantially reduced.

10 Claims, 3 Drawing Figures

SPREAD BEAM COMPUTATIONAL HARDWARE FOR DIGITAL BEAM CONTROLLERS

GOVERNMENT CONTRACT

The invention described herein was made in the course of, or under, a contract or subcontract thereunder with the United States Department of Air Force in relation to the Contract No. F33615-74-C-1040.

BACKGROUND OF THE INVENTION

The invention relates broadly to digital beam controllers for electronically controlled phased array radar systems, and more particularly, to apparatus for minimizing the computational hardware in the beam spreading computational section of the digital beam controller by utilizing generated random digital numbers in the round off operations of the digital computations associated with the elemental spread beam phase commands.

In general, electronically scanned array radar systems include a digital beam controller portion which sequentially computes beam phase command words for the antenna elements of the radar. Usually, the limiting factor of this type of radar is the ability of the antenna phase shifters to linearly follow the computed phase commands accurately. In most radars, the phase command value is computed to a higher degree of accuracy than that which the phase shift can follow. Consequently, most radars like the one described in U.S. Pat. No. 3,500,412, issued to R. G. Trigon on Mar. 10, 1970, for example, employ a round off operation which precedes the linking of the computed phase commands to the antenna element phase shifters. Accordingly, it is generally well known that rounding off of this type causes errors in computation. Individually, these round off errors are normally quite small, but when accumulated with the other computational errors in the radar system, they may, at times, render the composite phase command error to be out-of-specification.

Digital beam controllers are usually comprised of a pencil beam pointing computational section, such as the one described in some detail in the U.S. Pat. No. 3,643,075, issued to W. F. Hayes on Feb. 15, 1972, for example; and a beam spreading computational section, such as the one, described in adequate detail, in the U.S. Pat. No. 3,877,012, issued to E. A. Nelson on April. 8, 1975, for example. The resultant phase commands correspondingly computed from the aforementioned computational sections are coded together to form a composite phase command signal for each of the antenna element phase shifters. The problems associated with round off errors in the pencil beam pointing computational section are pretty well discussed in terms of digital quantization in the U.S. Pat. No. 3,643,075. Hayes, in his disclosure, claims to reduce substantially errors in the pencil beam pointing section as a result of the round off process conducted therein. This method comprises adding random numbers to predetermined residue least significant bits of the computed digital phase command words prior to truncation which apparently averages the round off errors to effectively reduce the mean round off error contribution to the overal beam pointing error. However, neither Hays' nor Nelson's disclosure is directed to round off errors in the beam spreading computational section.

Beam spreading computational sections of the type disclosed in Nelson generally utilize a quadratic non-linear phase function for computing the beam spreading phase commands which are distributed to the elements of a two-dimensioned antenna phase array. Computational round off errors associated with the derivation of the beam spreading phase commands may also contribute to the beam pointing errors. For example, a typical two-dimensioned parabolic type phase function used to compute the phase command for the beam spreading of a phased array radar is shown in the equation below:

$$\phi_N(m,n)=(K_1\, m\Delta Y+K_2\, n\Delta Z)^2+(K_3\, m\Delta Y+K_4\, n\Delta Z)^2; \quad (1)$$

where mΔY is the physical location of the phase shifter (m,n) in the horizontal dimension of the radar antenna and nΔZ is the physical location of the phase shifter (m,n) in the vertical dimension. $K_1(K_2)$ and $K_3(K_4)$ are factors related to the vertical (horizontal) parabolic spread factor and to the inertial navigation of the aircraft required to rotationally stabilize the vertical (horizontal) parabolic beam against aircraft motion and the pointing direction of the beam relative to antenna boresight. One known radar system implements the non-linear function denoted in equation (1) above as shown simply in FIG. 1.

Referring to FIG. 1, the values of the factors $K_1\Delta Y$, $K_2\Delta Z$, $K_3\Delta Y$ and $K_4\Delta Z$ generally derived by a radar data processor of a well-known variety which is usually functioning in cooperation with an inertial navigation system are respectively provided to digital storage registers 10, 11, 12 and 13 over signal lines 14, 15, 16 and 17. The storage registers 10, 11, 12 and 13 capture the information provided thereto as controlled by the gating signal 19 in a timely fashion derived by a conventional timing and control circuit 21. In this embodiment, the signals 14 through 17 may include digital words of 16 to 19 bits of digitally coded information. The outputs of the digital registers 10 through 14 are respectively coupled to one input of the conventional digital adders 22, 23, 24 and 25. The outputs of the adders 22 through 25 are captured by a corresponding set of digital storage registers 27, 28, 29 and 30 as controlled by the gating signals 32 and 34 also derived by the timing and control circuitry 21. The outputs of the registers 27 through 30 are respectively coupled to the second input of the digital adders 22 through 25. The outputs of the registers 27 and 28 are added together by a digital adder 36 and the outputs of the registers 29 and 30 are added together by another digital adder 38. Up to this point, the computations have been linear in nature. Both output words 40 and 42 of the adders 36 and 38, which may be comprised of 16 to 19 bits, are representative of the linear terms in equation (1) prior to squaring. A round off operation is performed on the digital words 40 and 42 by the round off circuits 44 and 46, respectively, which are described in greater detail hereinbelow. In rounding off, the digital words 40 and 42 may be truncated to 12 bits, for example, over signal lines 48 and 50, respectively. The digital words 48 and 50 are squared by the conventional digital squaring circuits 52 and 53 and their corresponding squared results 55 and 56 are added together by a digital adder 58 to form a spread beam phase command word 60 which may be, in turn, added to a beam pointing phase command word 62 in a digital adder 64 to form the composite phase command word 66. In general, the composite phase command word 66 is also rounded off a round off circuit 68 prior to being distributed to its corresponding associated phase shifter of a radar antenna array (not shown).

Operationally, each new desired beam shaping pattern is supplied to the registers 10 through 13 over signal lines 14 through 17, respectively, and accordingly captured therein as controlled in time by the gating signal 19. Thereafter, the phase commands for the individual antenna elements of the phased array are sequentially computed in accordance with a predetermined sequence. For example, if the phase shifters of the antenna are updated in a per column basis, gate timing pulses on signal line 32 are provided to registers 27 and 29 and the values in registers 10 and 12 are accumulated utilizing adders 22 and 24 and corresponding registers 27 and 29 for as many elements as there are in a column. At the completion of the phase command word computations for each column, a gate timing pulse over signal line 24 is provided to registers 28 and 30 to accumulate the values of registers 11 and 13 in registers 28 and 30, respectively. The pairs of storage registers 27 and 28, and 29 and 30 may be concurrently added together in digital adders 36 and 38, respectively, to form the linear terms 40 and 42 for each sequentially generated phase command word. The subsequent functions operate continuously in response to the sequential formation of linear terms 40 and 42 to form the non-linear two-dimensioned phase command word 60 as exhibited by equation (1). The sequential distribution of each phase command word to its corresponding phase shifter in the antenna array is conducted in a well-known manner. Reference is made to the patents referred to hereinabove for a more detailed description thereof.

Known embodiments for rounding off digital words suitable for use as round off functions of 44 and 46 are exhibited in more specific detail in FIG. 2. The digital words 40 and 42 are provided to one input of conventional digital adders denoted at 80 and 81, respectively. A one-half least significant bit ($\frac{1}{2}$ LSB) signal is added to each of the digital words 40 and 42 utilizing the adders 80 and 81. The outputs of the adders 80 and 81 are truncated at 82 and 84 to a predetermined number of bits. For example, assume that the digital words 40 and 42 are each 16 bits, then in the adders 80 and 81, a digital one is added to the 13th bit of each word 40 and 42, respectively. The addition results in 16 bit words which may be truncated at 82 and 84 to segregate the 12 most significant bits therefrom at 48 and 50, respectively, whereby the four least significant bits of the adder outputs are discarded. By utilizing this type of round off apparatus, it is determined from the known theories of linear pointing errors that the round off operations applied to the digital words which appear at 40 and 42 are least accurate in the region where all their values are at an integer number of half-quanta and also near where their values are at an integer number of quanta.

In the case of integer multiples of half-quanta, it may be assumed that round off errors denoted by $K_5$ and $K_6$ are generated by the round off process of 44 and 46, respectively, and in so assuming equation (2) may be rewritten as:

$$\phi'_N(m,n)=(K_1\Delta m\ Y+K_2\ n\Delta Z+K_5)^2+(K_3 m\Delta Y+K_4\ n\Delta Z+K_6)^2 \qquad (2)$$

Expanding equation (2), it is found that:

$$\phi'_N(m,n)=\phi_N(m,n)+\{(K_5K_1+K_6K_3)m\Delta Y+(K_5K_2+K_6K_4)n\Delta Z\}+(K_5^2+K_6^2) \qquad (3)$$

The first term of equation (3) is the desired beam shaping phase command word of equation (1); the second term is a linear term which represents a pointing angle error contribution in the antenna phased array; and the third term is a constant term. If the non-linear phase function $\phi$(m,n) is uniformly distributed over the entire face of the antenna, the third term has no contribution to the beam pointing error. However, if the non-linear phase term (m,n) appears only over part of the antenna any, as would be the case in $CSC^2$ type beam shaping, then the third term would be a non-symmetric error rendering a contribution to the beam pointing error. It is thus shown that round off errors in the beam spreading computational section also contribute to the beam pointing errors and accordingly should be considered in the accuracy of the sizing of the digital words in beam spreading computational sections.

In most high performance electronically controlled phase array radars, it is sometimes essential that the radar beam be updated frequently causing the elemental digital phase command word computations to be performed at relatively high speeds. Consequently, each squaring operation shown in FIG. 2 at 52 and 53 is presently implemented by either a high speed multiplier comprising a known interconnection of medium scale integrated (MSI) logic circuits or a large number of high speed desirably programed integrated memory circuits. In one known radar system which has been sized for the purposes of computational accuracy to use 12 bit digital words at 48 and 50, the digital multipliers at 52 and 53 each comprise approximately 25 MSI circuits to compute a 24 bit word at both 55 and 56. An additional 6 MSI conventional adder circuits are embodied at 58 to add the squared digital words at 55 and 56 to form the beam spreading phase command word at 60 of which only eight bits are generally used. In this same known radar systems, if conventional 512×4 programmed read-only-memories of the high speed variety were used to implement the multiplier, it is estimated that it would require approximately 70 MSI circuit chips to provide for the same 8 bit digital word at 60. These types of hardware implementations represent space, cost, and reliability limitations to the specification and operation of the radar system.

One proposed alternative for minimizing the computational hardware of the beam spreading computational section, exemplarily illustrated in FIG. 2, is to reduce the number of bits of the digital words at 48 and 50 by rounding off of the digital words 40 and 42 to a more significant bit level, like 8 bits, for example, However, if this is attempted with the present round off apparatus, described in connection with the embodiment of FIG. 2, the smoothing or averaging effect of the round off operation is not expected to be adequate, in all cases, to reduce the mean error in the beam pointing command words, contributed by the round off operation, to within specification limits. Apparently, errors contributed by the round off operations at 44 and 46 in FIG. 2 have a tendency to peak when the distribution levels of the input digital words 40 and 42 are principally periodically related to integer numbers of half-quanta. As a result, the smearing or smoothing effects of the present round off operation, proposedly do not alleviate the problem of round of error peaking given the one-sided distribution levels of the input digital words. It appears that if the accuracy of the computations could be preserved under all conditions, especially that of round off induced error peaking just described, then the number of bits may be reasonably reduced ultimately leading to a minimization of computational hardware.

SUMMARY OF THE INVENTION

A spread beam computational section of a digital beam controller for an electronically controlled phased array radar system includes a linear computational portion for computing a plurality of predetermined groupings of intermediate phase command digital words corresponding to a desired spread beam radar pattern, each intermediate phase command digital word having a primary number of bits and a residue number of bits; and a non-linear computational portion for computing a spread beam phase command word from each computed predetermined grouping of intermediate phase command digital words which have been digitally rounded off. In accordance with the present invention, apparatus is disposed within the spread beam computational section for digitally rounding off each computed predetermined grouping of intermediate phase command digital words, the apparatus comprising: a random number generator for randomly generating digital words sized in relation to the residue number of bits of the computed intermediate phase command digital words; means for digitally adding a digital word randomly generated from the random number generator to the residue bits of the computed intermediate phase command words in each predetermined grouping to generate a corresponding plurality of groupings of resultant digital words; and means for truncating the resultant digital words of each grouping to the primary number of bits and for providing each grouping of truncated resultant digital words to the non-linear computational portion of the beam spreading computational section.

More specifically, the digital adding means includes a digital adder for each intermediate phase command digital word in the predetermined grouping to add a randomly generated digital word to the residue number of bits thereof. The resultant output word of each digital adder is truncated to the primary number of bits prior to being provided to the non-linear computational section. Furthermore, the random number generator comprises at least one read only memory having addressably accessible registers programmed with digital words which are organized in accordance with a consecutive addressing pattern of the programmed registers; and means, preferably a digital counter, for addressing the at least one read only memory in a consecutive pattern to render a random generation pattern of digital words from the at least one read only memory. Each randomly generated digital word is preferably sized to a portion of the residue number of bits of the intermediate phase command digital word and in accordance with one embodiment, added to the most significant bits of the residue number of bits of the predetermined groupings of computed intermediate phase command digital words.

DESCRIPTION OF THE PREFERRED EMBODIMENT

Figure 1:
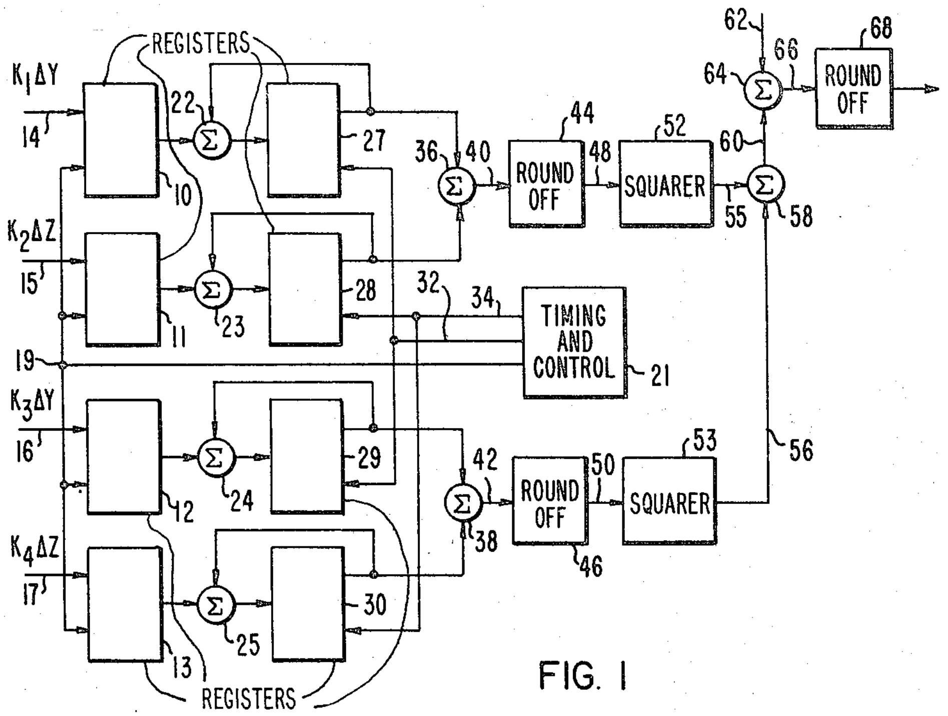
FIG. 1 is an exemplary block diagram schematic embodiment of a beam spreading computational section of a beam controller for an electronically controlled phased array radar.
Figure 3:
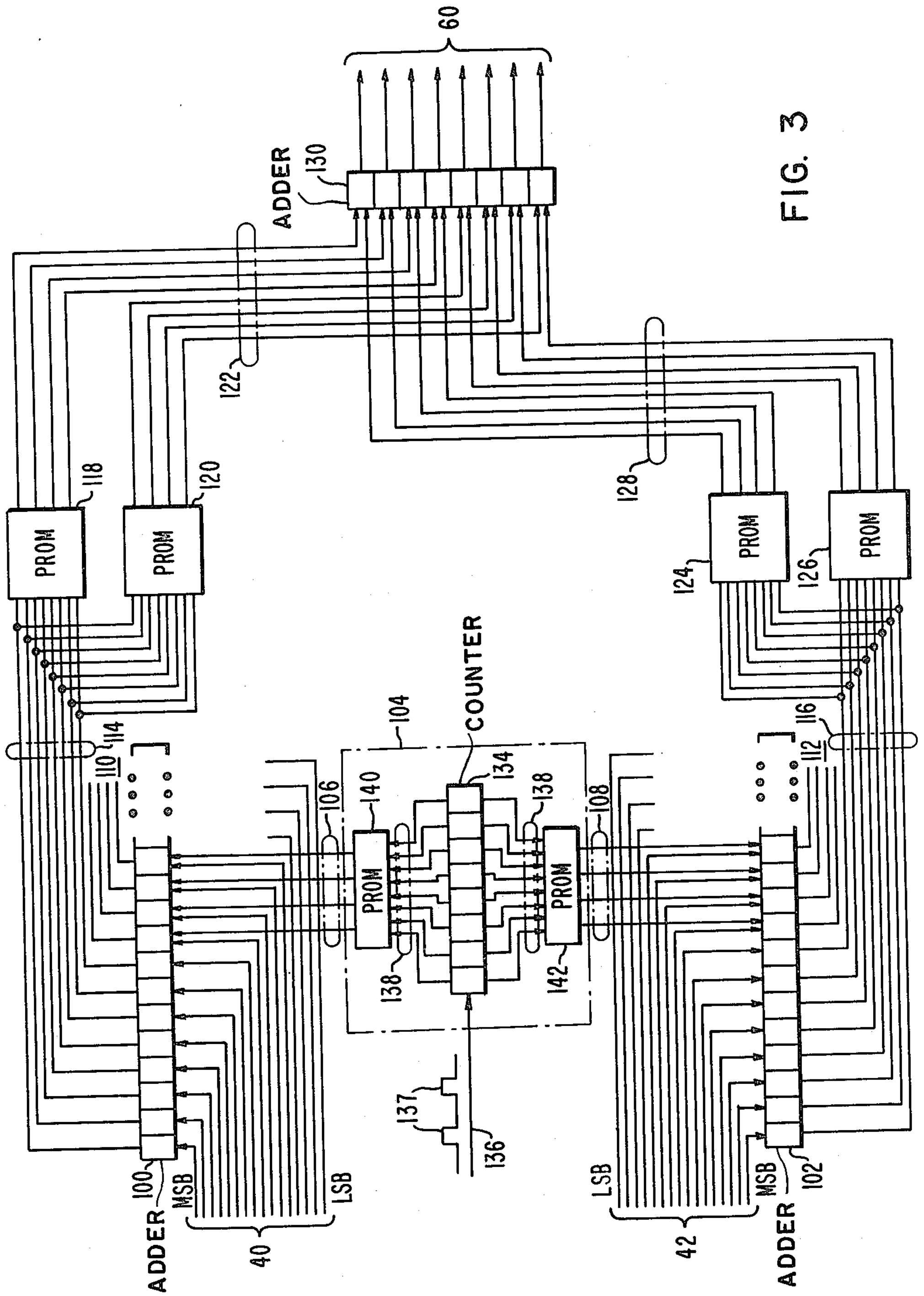
FIG. 3 is a circuit schematic diagram depicting an improved embodiment of computational hardware for use in beam spreading computational sections typical of that shown in FIG. 1.

A detailed circuit schematic embodiment of an improved round off apparatus disposed within the beam spreading computational section of a beam controller is shown in FIG. 3. The intermediately computed digital words 40 and 42, resulting from the linear computational portions of the beam spreading computational sections as illustratively exemplified in FIG. 1, are input to conventional digital adders 100 and 102, respectively. The digital words 40 and 42 may be each sized to 16–19 bits of binary code, for example, to achieve the computational accuracy specified for the beam spreading phase command words shown at 60. A predetermined number of bits, say the upper or most significant 8 bits, for example, of each of the digital words 40 and 42 may be considered the primary number of bits which are accurately significant to the subsequent non-linear multiplicative operations performed by the beam spreading computational section as described in connection with the embodiment of FIG. 1. The remaining 8–11 bits, for example, of each of the digital words 40 and 42 may be considered as the residue number of bits.

In accordance with the present invention, a psuedo-random number generator 104 generates random digital words at 106 and 108 sized in relation to the number of residue bits assigned to each of the input digital words 40 and 42. The randomly generated digital words 106 and 108 are provided to the digital adders 100 and 102 wherein they may be respectively added to the residue bits or preselected portion thereof of the digital words 40 and 42. For example, in the present embodiment, the number of bits in each randomly generated digital words 106 and 108 is 4 bits and these 4 bits are respectively added to the four most significant bits of the residue bits of each of the digital words 40 and 42 in the digital adders 100 and 102 correspondingly coupled thereto.

The resultant digital word outputs of the digital adders 100 and 102, which may be 12 bits as shown in the present embodiment, are truncated at points 110 and 112, respectively. The number of bits in the residue portion resulting from the addition operation are discarded and the truncated number of bits 114 and 116 resulting from the additions of 100 and 102 are coupled to the address inputs of two pairs of programmed read only memories (PROM's) 118, 120 and 124, 126, respectively. In the present embodiment, for example, the number of bits truncated at 110 and 112 to form the digital words 114 and 116 is 8 bits (i.e. the most significant 8 bits) which are provided to the address inputs of the corresponding pairs of PROM's 118, 120 or 124, 126 for the purposes of performing a squaring operation therein.

Each PROM 118 and 120 may be of the 256-4 bit type wherein each 4 bit register contained in PROM 118 may be programmed with the most significant 4 bits of an 8 bit word denoted at 122 which is representative of the square of the digital word address at 114, and wherein each 4 bit register contained in PROM 120 may be programmed to contain the least significant 4 bits of the 8 bit word 122. Accordingly, the composite digital word at 122 represents the square of the address input word 114 coupled to the pair of PROM's 118, 120. Similarly, the digital word 116 is provided to the address inputs of another two identically programed ROM's 124 and 126, and likewise, the composite 8 bit digital word at 128 is representative of the square of the digital word 116 in accordance with the programming of the PROM's 124 and 126. Further, the digital words 122 and 128 may be digitally added in a conventional digital adder shown at 130 to form an 8 bit beam spreading phase command word 60.

In more specific detail, the pseudo-random number generator 104 comprise a conventional digital counter 134, which for the purposes of the present embodiment, may be assumed to have a capacity of 8 bits, for example, and may be incremented by pulses over signal line 136. These pulses, illustrated at 137, may be timed in sequence, generally synchronized with the computations of the elemental phase command words, by the timing and control unit 21 which is shown in the embodiment of FIG. 1. The counter outputs 138 are coupled to the address inputs of each of the two PROM's 140 and 142 of the 256 4-bit word variety which effect the pseudo-random words at 106 and 108, respectively, in response to the sequence of address inputs 138 and in accordance with the programmed words contained therein. The pseudo-randomness results from the PROM's 140 and 142 having only a limiting capacity of registers which are addressably periodically accessed in the course of generating the phase command words for the elements of the radar phase array for each desired beam pattern; however, the effects of the periodic accessing of the random words programmed in the PROM's 140 and 142 appear practically random in nature to the elemental beam spreading phase command word computations. An example of the programming pattern of random 4 bit words for each of the PROM's 140 and 142 is displayed in Appendix 1 following the instant disclosure. In Appendix 1, the registers are tabulated in columns such that the number to the left of each column is the decimal equivalent of the input binary 8 bit address word 138 and the digital word to the right of each column is the random digital word 106 or 108 programmed in the register accessed by the corresponding address word 138.

In operation, as each pair of digital words 40 and 42 are intermediately computed and presented to the digital adders 100 and 102, the random words 106 and 108, accessed by the address outputs of the incremented digital counter 134, are added to the preselected residue bits of the digital words 40 and 42, respectively. The resultant words of the adders 100 and 102 are truncated at 110 and 112 and the truncated words 114 and 116 are used to access registers in the pairs of PROM's 118, 120 and 124, 126 corresponding thereto. The composite digital word output 122 and 128 of each pair of PROM's is representative of the square of its corresponding address word 114 and 116. To complete the beam spreading phase command word computations, the digital words 122 and 128 are added in the digital adder 130 to form the 8 bit elemental phase command words at 60.

The improved round off apparatus comprising the random number generator 104; digital adders 100 and 102; and the truncations at 110 and 112 permit the input intermediate digital words 40 and 42, computed in the linear computational portion of the beam spreading computational section, to be rounded off to fewer significant bits. For example, in the round off portion depicted in the known embodiment of FIG. 2, the input words were rounded off to 12 bits at points 48 and 50 to ensure that the round off errors would be maintained within specification limits allocated for the beam spreading computational section for all cases especially including the case in which the input digital words 40 and 42 have a one-sided distribution of signal levels periodically related to integer numbers of half-quanta. In contrast, the improved embodiment described in connection with FIG. 3 includes a randomization process in the round off apparatus brought about by the generation of random words which are added to the preselected portion of residue bits of the digital words 40 and 42. This embodied randomization process makes it possible to truncate the resultant words of the round off addition to fewer significant bits. For the purposes of the embodiment illustrated in FIG. 3, the resultant words of the addition were rounded off to 8 bits. Even though there are a fewer number of bits, say 8 bits for example, being used in the subsequent beam spreading phase command word non-linear multiplicative calculations, the randomization process in the rounding off apparatus shown in FIG. 3 alleviates substantially the effects of error peaking due to any one-sided distribution levels of input digital words and preserves substantially the accuracy of the beam spreading phase command word computations.

Figure 2:
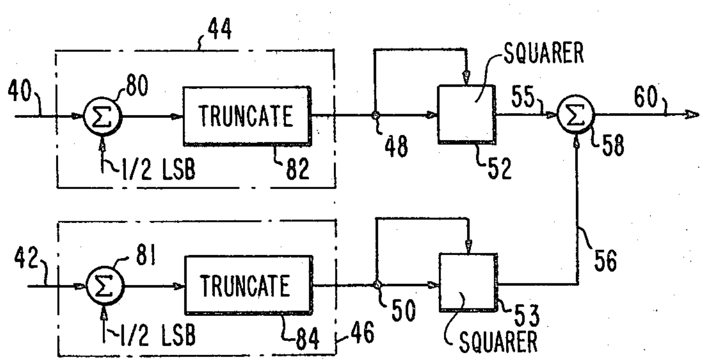
FIG. 2 is a more detailed schematic diagram of round off apparatus known to be used in beam spreading computational sections similar to that shown in FIG. 1.

Another area of contrast between the computational sections illustrated in FIGS. 2 and 3 is that of the hardware implementation. It has been estimated that the hardware for the multiplications 52 and 53 require approximately 25 medium scale integration logic circuit chips each and the hardware for the digital adders 80, 81 and 58 require approximately 16 MSI chips, thereby making a total of approximately 66 MSI chips. Comparing this figure of 66 with the figure 20 which is the approximate number of MSI chips that are needed to implement the circuitry illustrated in FIG. 3, it is apparent that the improved circuitry of FIG. 3 has substantially minimized the computational hardware of the beam spreading computational sections of the beam controller. It appears that the principles of the present invention permit a phase array beam controller, similar in design to that shown in FIG. 1, to be designed with significantly less hardware while maintaining substantially the same radar system performance. The decrease in hardware implementation quantitatively saves cost, weight, volume, power, computational time and complexity while qualitatively increasing the system reliability.

The random number generator depicted at 104 in FIG. 3, is disposed between the linear and non-linear computational portions within the beam spreading computational section primarily because the round off error effects cannot be corrected after they have passed through the non-linear computational portion by downstream randomization processes, like that which may be occurring in the pencil beam pointing computational section, for example, and in addition because the random number generator roundoff operation cannot correct for periodic round off effects that occur beyond its location in the system.

APPENDIX 1 - TYPICAL ROM PROGRAM PATTERN

| ADDRESS | DATA | ADDRESS | DATA | ADDRESS | DATA | ADDRESS | DATA | ADDRESS | DATA | ADDRESS | DATA | ADDRESS | DATA | ADDRESS | DATA |
|---|---|---|---|---|---|---|---|---|---|---|---|---|---|---|---|
| 0 | 0011 | 32 | 1010 | 64 | 1111 | 96 | 0110 | 128 | 1101 | 160 | 1001 | 192 | 1100 | 224 | 0100 |
| 1 | 0100 | 33 | 1001 | 65 | 0100 | 97 | 1000 | 129 | 0100 | 161 | 1110 | 193 | 0101 | 225 | 0011 |
| 2 | 0001 | 34 | 1101 | 66 | 1101 | 98 | 1111 | 130 | 1100 | 162 | 0110 | 194 | 0001 | 226 | 1101 |
| 3 | 1010 | 35 | 0110 | 67 | 1111 | 99 | 0010 | 131 | 0100 | 163 | 0000 | 195 | 1000 | 227 | 0111 |
| 4 | 0111 | 36 | 0010 | 68 | 1000 | 100 | 0100 | 132 | 0111 | 164 | 0010 | 196 | 1010 | 228 | 1011 |
| 5 | 1100 | 37 | 1100 | 69 | 0110 | 101 | 0001 | 133 | 0011 | 165 | 0110 | 197 | 1001 | 229 | 0010 |
| 6 | 0100 | 38 | 1110 | 70 | 1010 | 102 | 0100 | 134 | 0001 | 166 | 1001 | 198 | 1010 | 230 | 0000 |
| 7 | 1110 | 39 | 1011 | 71 | 0101 | 103 | 0110 | 135 | 0010 | 167 | 0000 | 199 | 1111 | 231 | 1101 |
| 8 | 1001 | 40 | 1011 | 72 | 0111 | 104 | 1000 | 136 | 0110 | 168 | 0011 | 200 | 0100 | 232 | 0011 |
| 9 | 1110 | 41 | 0101 | 73 | 1101 | 105 | 0110 | 137 | 1110 | 169 | 1001 | 201 | 1111 | 233 | 1110 |
| 10 | 0011 | 42 | 0110 | 74 | 1111 | 106 | 1101 | 138 | 0010 | 170 | 1000 | 202 | 0010 | 234 | 0011 |
| 11 | 1010 | 43 | 1100 | 75 | 0101 | 107 | 1111 | 139 | 1001 | 171 | 1111 | 203 | 0100 | 235 | 1111 |
| 12 | 0110 | 44 | 1111 | 76 | 1100 | 108 | 1110 | 140 | 0011 | 172 | 0101 | 204 | 0001 | 236 | 0101 |
| 13 | 1000 | 45 | 0010 | 77 | 1001 | 109 | 0000 | 141 | 1110 | 173 | 1111 | 205 | 1000 | 237 | 1110 |
| 14 | 1001 | 46 | 1011 | 78 | 0010 | 110 | 0010 | 142 | 0100 | 174 | 0101 | 206 | 0011 | 238 | 0000 |
| 15 | 1000 | 47 | 0110 | 79 | 1010 | 111 | 1011 | 143 | 1100 | 175 | 0011 | 207 | 1101 | 239 | 1101 |
| 16 | 0011 | 48 | 1001 | 80 | 0111 | 112 | 0000 | 144 | 0000 | 176 | 1000 | 208 | 0111 | 240 | 0000 |
| 17 | 1110 | 49 | 1010 | 81 | 0100 | 113 | 1001 | 145 | 0101 | 177 | 1111 | 209 | 0001 | 241 | 0010 |
| 18 | 1000 | 50 | 1011 | 82 | 1110 | 114 | 0101 | 146 | 1101 | 178 | 0100 | 210 | 1010 | 242 | 0101 |
| 19 | 0011 | 51 | 0001 | 83 | 1010 | 115 | 1011 | 147 | 0011 | 179 | 1110 | 211 | 1101 | 243 | 0000 |
| 20 | 0101 | 52 | 0110 | 84 | 1101 | 116 | 1101 | 148 | 1110 | 180 | 0010 | 212 | 0000 | 244 | 1110 |
| 21 | 0010 | 53 | 1000 | 85 | 0111 | 117 | 1010 | 149 | 1011 | 181 | 1000 | 213 | 0100 | 245 | 0010 |
| 22 | 1000 | 54 | 0110 | 86 | 1111 | 118 | 0011 | 150 | 1100 | 182 | 0011 | 214 | 1111 | 246 | 0111 |
| 23 | 0010 | 55 | 1110 | 87 | 0000 | 119 | 0100 | 151 | 1001 | 183 | 1001 | 215 | 0001 | 247 | 0100 |
| 24 | 0101 | 56 | 0100 | 88 | 0001 | 120 | 1100 | 152 | 0011 | 184 | 1111 | 216 | 1011 | 248 | 1001 |
| 25 | 1000 | 57 | 1101 | 89 | 1100 | 121 | 1010 | 153 | 0011 | 185 | 0111 | 217 | 1100 | 249 | 0000 |
| 26 | 1100 | 58 | 0110 | 90 | 1100 | 122 | 0011 | 154 | 0100 | 186 | 1001 | 218 | 1011 | 250 | 1111 |
| 27 | 1011. | 59 | 1000 | 91 | 0110 | 123 | 0001 | 155 | 0110 | 187 | 1111 | 219 | 1000 | 251 | 0100 |
| 28 | 0101 | 60 | 1101 | 92 | 1011 | 124 | 0011 | 156 | 1001 | 188 | 0010 | 220 | 0000 | 252 | 1010 |
| 29 | 1101 | 61 | 0111 | 93 | 0101 | 125 | 0110 | 157 | 1011 | 189 | 1000 | 221 | 0101 | 253 | 1001 |
| 30 | 1011 | 62 | 1100 | 94 | 1111 | 126 | 0001 | 158 | 1100 | 190 | 1110 | 222 | 1101 | 254 | 0000 |
| 31 | 0011 | 63 | 1011 | 95 | 1011 | 127 | 1110 | 159 | 0011 | 191 | 0001 | 223 | 1100 | 255 | 0101 |

I claim:

1. In a spread beam computational section of a digital beam controller for an electronically controlled phased array radar system including a linear computational portion for computing a plurality of groups of a predetermined number of intermediate phase command digital words corresponding to a desired spread beam radar pattern, each intermediate phase command digital word having a predetermined primary number of bits and a predetermined residue number of bits; and a non-linear computational portion for computing a spread beam phase command digital word from each computed group of said intermediate phase command digital words which have been digitally rounded off, the improvement of an apparatus for digitally rounding off each computed group of intermediate phase command digital words comprising:

- a random number generator for randomly generating digital words sized in relation to the predetermined residue number of bits of said computed intermediate phase command digital words;
- means for digitally adding a digital word randomly generated from said random number generator to the predetermined residue bits of said computed intermediate phase command digital words in each computed group to generate a corresponding plurality of groups of resultant digital words; and
- means for truncating the resultant digital words of each group to said predetermined primary number of bits and for providing each group of truncated resultant digital words to said non-linear computational portion of said beam spreading computational section.

2. Digital rounding off apparatus in accordance with claim 1 wherein the digital adding means includes a digital adder for each of the predetermined number of intermediate phase command words in the computed groups, said digital adder adding a randomly generated digital word to the predetermined residue number of bits of said intermediate phase command words of each computed group; and wherein the output word of each digital adder is truncated to said predetermined primary number of bits prior to being provided to said non-linear computational portion.

3. Digital rounding off apparatus in accordance with claim 1 wherein the random number generator comprises:

- at least one read only memory having addressably accessible registers programmed with digital words which are randomly organized in accordance with a consecutive addressing pattern of said registers; and
- means for addressing said at least one read only memory in a consecutive pattern to render a random generation pattern of digital words from said at least one read only memory.

4. Digital rounding off apparatus in accordance with claim 3 wherein the addressing means is a digital counter.

5. Digital rounding off apparatus in accordance with claim 1 wherein each randomly generated digital word is sized to a portion of the residue number of bits of the intermediate phase command digital word.

6. Digital rounding off apparatus in accordance with claim 5 wherein the randomly generated digital word is added to the upper most significant bits of the predetermined residue number of bits of the intermediate phase command digital word.

7. Digital rounding off apparatus in accordance with claim 5 wherein the intermediate phase command digital words are each at least 16 bits; wherein the predetermined primary number of bits is the most significant 8 bits of each intermediate phase command digital word; wherein the predetermined residue number of bits is the least significant at least 8 bits of each intermediate phase command digital word; and wherein the randomly generated digital words are each 4 bits and are added to the 4 most significant bits of the predetermined residue at least 8 bits of each intermediate phase command digital word.

8. Digital rounding off apparatus in accordance with claim 1 wherein each computed group contains a pair of intermediate phase command digital words.

9. In a spread beam computational section of a digital beam controller for an electronically controlled phased array radar system including a linear computational portion for computing a plurality of pairs of intermediate phase command digital words, each having a primary number of bits and residue number of bits; and a non-linear computational portion for computing a spread beam phase command digital word from each of said computed pairs of intermediate phase command digital words which have been digitally rounded off, the improvement of an apparatus for digitally rounding off each computed pair of intermediate phase command digital words comprising:

a random number generator for randomly generating digital words sized to a portion of the residue number of bits of said computed intermediate phase command digital words;

means for digitally adding to the upper most significant bit portion of the residue number of bits of each computed pair of intermediate phase command digital words, a digital word randomly generated from said random number generator to generate a plurality of resultant pairs of digital words; and means for truncating each resultant pair of digital words to said primary number of bits and for providing each truncated pair of digital words to said non-linear computational portion of said beam spreading computational section.

10. Digital rounding off apparatus in accordance with claim 9 wherein the computed intermediate phase command words are each at least 16 bits; wherein the primary number of bits is the 8 most significant bits and the residue number of bits is the at least 8 least significant bits; and wherein the randomly generated digital words are each 4 bits which are added to the 4 most significant bits of the residue at least 8 bits of each computed pair of intermediate phase command digital words.

* * * * *